(12) United States Patent
Wolfman et al.

(10) Patent No.: US 8,285,261 B2
(45) Date of Patent: Oct. 9, 2012

(54) NETWORKED PROVISION OF MOBILE TELEPHONE APPLICATION DATA

(75) Inventors: Shlomo Wolfman, Hod-HaSharon (IL); Ory Biran, Kiryat-Tivon (IL)

(73) Assignee: StarHome GmbH, Zurich (CH)

( * ) Notice: Subject to any disclaimer, the term of this patent is extended or adjusted under 35 U.S.C. 154(b) by 356 days.

(21) Appl. No.: 12/517,368

(22) PCT Filed: Jan. 23, 2008

(86) PCT No.: PCT/IL2008/000106
§ 371 (c)(1), (2), (4) Date: Jun. 3, 2009

(87) PCT Pub. No.: WO2008/090556
PCT Pub. Date: Jul. 31, 2008

(65) Prior Publication Data
US 2010/0056117 A1    Mar. 4, 2010

Related U.S. Application Data (60) Provisional application No. 60/902,519, filed on Feb. 22, 2007, provisional application No. 60/881,850, filed on Jan. 23, 2007.

(51) Int. Cl.
*H04M 3/42* (2006.01)

(52) U.S. Cl. ............. 455/414.1; 455/415; 455/433; 455/466; 370/352

(58) Field of Classification Search ........... 455/414.1, 455/550.1, 556.1, 556.2, 557
See application file for complete search history.

(56) References Cited

U.S. PATENT DOCUMENTS

| 7,120,424 | B1 * | 10/2006 | Coan et al. ............ 455/414.1 |
| 7,187,932 | B1 * | 3/2007 | Barchi ............... 455/445 |
| 7,809,398 | B2 * | 10/2010 | Pearson ............ 455/550.1 |
| 2004/0204070 | A1 * | 10/2004 | August et al. ........ 455/557 |
| 2005/0020250 | A1 * | 1/2005 | Chaddha et al. ..... 455/414.1 |
| 2006/0199567 | A1 * | 9/2006 | Alston ............. 455/412.1 |
| 2006/0227956 | A1 * | 10/2006 | Pearson ........... 379/207.15 |

FOREIGN PATENT DOCUMENTS
WO    WO 2005/117460    12/2005

OTHER PUBLICATIONS

International Preliminary Report on Patentability Dated Aug. 6, 2009 From the International Bureau of WIPO Re.: Application No. PCT/IL2008/000106.
International Search Report Dated Jun. 23, 2008 From the International Searching Authority Re.: Application No. PCT/IL2008/000106.
Written Opinion Dated Jun. 23, 2008 From the International Searching Authority Re.: Application No. PCT/IL2008/000106.

* cited by examiner

*Primary Examiner* — Temica M Beamer (57) ABSTRACT

A network based host comprising an agent for mobile telephones, the agent being associated with a mobile telephone users the agent comprising: mobile telephone application data; and an interface to make the application data available over the network to devices of the mobile telephone user and to provide the data for telephony operations by a remotely connecting mobile telephony device of the mobile telephone user.

21 Claims, 5 Drawing Sheets

NETWORKED PROVISION OF MOBILE TELEPHONE APPLICATION DATA

RELATED APPLICATIONS

This Application is a National Phase of PCT Patent Application No. PCT/IL2008/000106 having International filing date of Jan. 23, 2008, which claims the benefit of U.S. Provisional Patent Application Nos. 60/902,519 filed on Feb. 22, 2007, and 60/881,850 filed on Jan. 23, 2007. The contents of the above Applications are all incorporated herein by reference.

FIELD AND BACKGROUND OF THE INVENTION

The present invention, in some embodiments thereof, relates to a cellular telephone networked agent and, more particularly, but not exclusively, to networked provision of telephone features.

Mobile telephones are processor based computing devices and are tending to be supplied with more and more applications beyond their basic function of terminal units for cellular telephony. One of the most basic applications that a mobile telephone has is an address book.

There also exists the network address book (NAB), currently intended as a backup for the personal address book stored on the mobile device. The user needs to synchronize between the NAB and the device whenever a new entity is added to either one of them. The NAB may be implemented as a Microsoft Outlook address book, where the synchronization operation is taken care of automatically, but there are still two copies of the address book, and synchronization errors and failures.

The NAB is currently merely a personal address book. The user may add entities from other directories, but only off-line and manually.

Information related to telephony call log and SMS messages are stored today on the mobile device itself. Missed calls information, recent call logs, SMS messages and notifications and other event logs are all stored in this way. This information is not accessible from other devices for example to react to a missed call. In case of device failure, the information can be lost. A backup of this information is not supported by the currently available mobile devices, and even if supported, typical backup problems would be raised as already mentioned in the case of the NAB.

SUMMARY OF THE INVENTION

An aspect of embodiments of the present invention provide for a software agent of the mobile telephone which is located on the network and supports one or more telephone applications including data storage associated with the application. The data is stored at a safe location which is independent of the mobile device, does not need to be synchronized with the mobile telephone and can be made available from the networked location to other devices of the same user as desired. The networked agent may have access to other networked resources to supplement the user's data.

According to an aspect of some embodiments of the present invention there is provided a cellular telephone configured with a network connection to a remote agent, the remote agent configured with the cellular telephone to carry out at least one call related data retrieval activity for the cellular telephone, the call related data retrieval activity being in response to interface activity at the telephone communicated to the remote agent via the network connection, call related data of the call related data retrieval activity being retrievable from the remote agent to the cellular telephone to enhance call activity at the telephone.

Preferably, the call related data retrieval activity comprises obtaining a telephone number in response to identification of a call destination from the interface activity.

The cellular telephone may be configured to provide address book functions via the remote agent.

The cellular telephone may be a wireless application protocol (WAP) connection, a general packet radio service (GPRS) connection, a WiFi connection, a WiMAX connection or an LTE connection, or any other suitable connection according to available technologies.

According to a second aspect of the present invention there is provided a network based host comprising an agent for mobile telephones, the agent being associated with a mobile telephone user, the agent comprising:

mobile telephone application data; and an interface to make the application data available over the network to devices of the mobile telephone user and to provide the data for telephony operations by a remotely connecting mobile telephony device of the mobile telephone user.

In an embodiment, the application is an addressbook application accepting query information and providing a corresponding dialing sequence.

In an embodiment, the addressbook application comprises a customized addressbook layer for a respective mobile telephone user.

In an embodiment, the addressbook application further comprises a common directory layer provided in common to a plurality of users.

In an embodiment, the addressbook application is configured to receive a search query from the user, carry out an initial search in the customized layer, return any result found, and if no result is found then to carry out a further search in the global directory layer.

In an embodiment, the common directory layer comprises a global directory.

An embodiment may be configured to receive the search query from a first device, and to return the corresponding dialing sequence to a second device, the first and second devices both being associated with the respective user.

In an embodiment, the first device is an Internet-enabled device and the second device is a telephony-enabled device.

An embodiment may be associated with a signaling detection unit to detect telephony events of the cellular user.

An embodiment may comprise a call log application, the data comprising call log information obtained from the signaling detection unit.

The call log information may comprise missed call information, incoming call information, or received call information.

An embodiment may comprise a messaging log application for logging messaging events.

In an embodiment, the messaging events comprise SMS events—including MMS events, or IM (Instant Messaging) events.

An embodiment may comprise a messaging application, and the data comprises messages sent to and from mobile telephone devices of the user.

An embodiment may comprise a call log application storing recently used telephone numbers, combined with the addressbook application, therewith to provide data of the recently used telephone numbers as initial query results.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

The present invention, in some embodiments thereof, relates to a cellular telephone networked agent and, more particularly, but not exclusively, to networked provision of telephone features.

Embodiments of the present invention provide for a software agent of the mobile telephone which is located on the network and supports one or more telephone applications including data storage associated with the application. The applications may include an address book, call logging, and SMS related applications.

The data, addresses, call logs, etc is stored at a safe location which is on the network and therefore independent of the mobile device itself, so that data is not lost when the mobile phone fails. The data does not need to be synchronized since it is not stored on the mobile telephone, and the data can be made available from the networked location to other devices of the same user that are able to access the network location. Thus a user may have more than one mobile telephone but a single address book.

Furthermore Internet devices such as a user's home computer may be able to access the address book. A method is provided of allowing the user's home computer to place a call using the phonebook, and the home computer can further be used to update or configure the address book. The latter is useful because home computers typically have easier interfaces for users to add information.

The networked agent may have access to other networked resources to supplement the user's data. Thus a global address book may be accessed by the user to find telephone numbers that do not appear in his personalized address book. In one embodiment, the personalized address book may be set to be automatically updated from the global address book when telephone calls are made.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Figure 1:
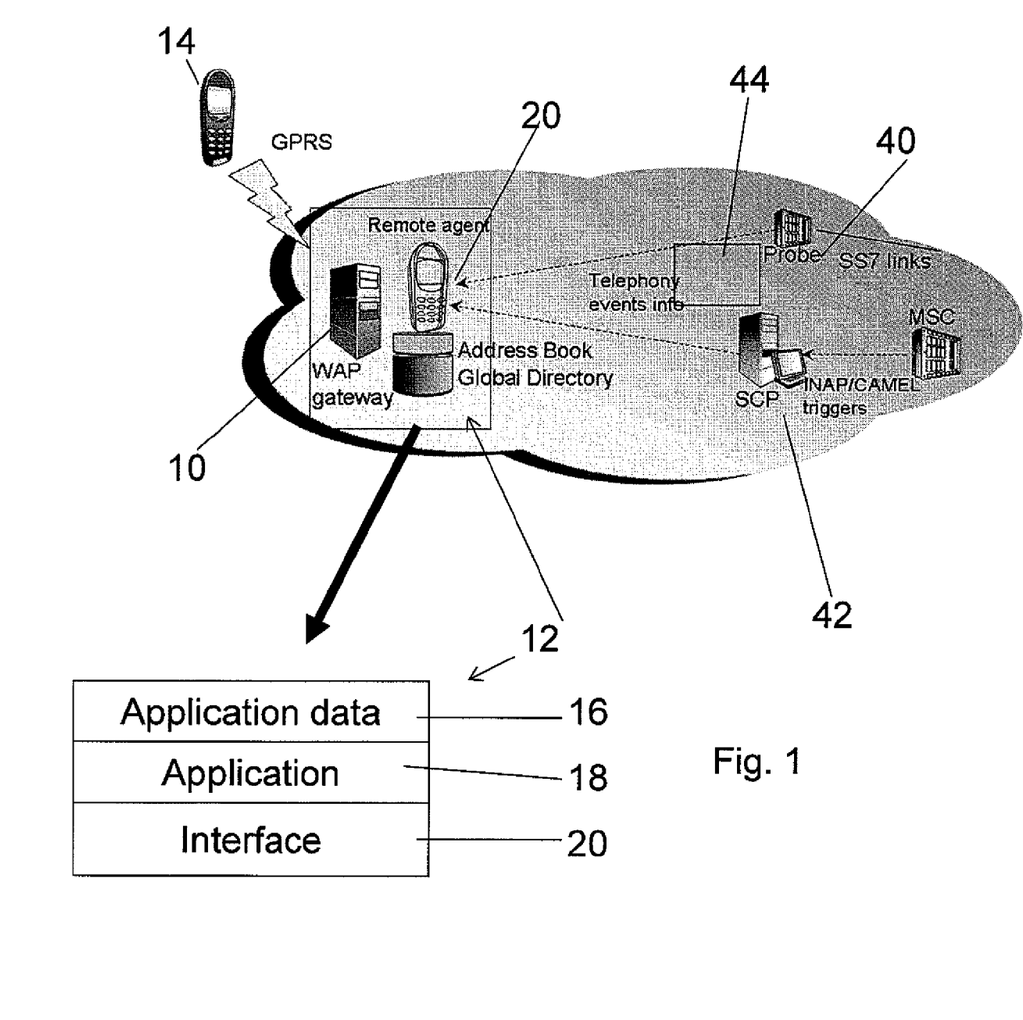
FIG. 1 is a simplified diagram showing network based mobile agent situated on a network according to a first embodiment of the present invention.

Referring now to the drawings, FIG. 1 illustrates a network based host 10 comprising an agent 12 of mobile telephone 14. The agent may be an agent of the mobile telephone user associated with the mobile telephone 14 rather than of the telephone itself.

The agent 12 comprises mobile telephone application data 16 of the telephone, such as addresses, call log data, SMS data etc, that is data belonging to the address book, SMS and call log applications. Typically the agent includes the applications themselves 18 for using the data. The agent further includes an interface 20 to make application data available over the network to devices of the mobile telephone user. Interface 20 may be able to provide the data for telephony operations by a remotely connecting mobile telephony device 14 of the mobile telephone user.

Figure 2:
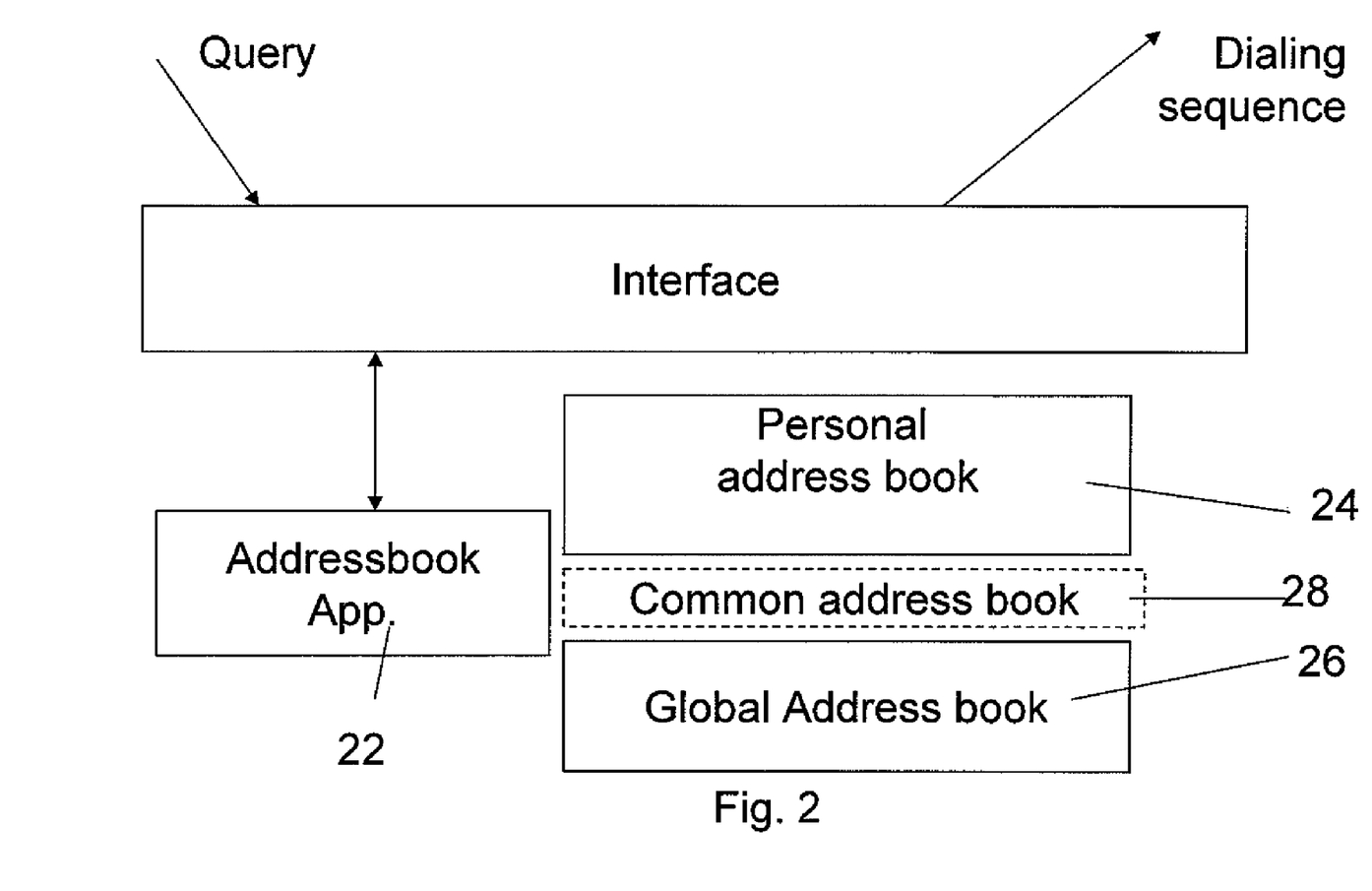
FIG. 2 is a simplified diagram illustrating a network-agent supported addressbook application according to the embodiment of FIG. 1.

Reference is now made to FIG. 2 which illustrates an embodiment in which the application is an address book application accepting query information and providing a corresponding dialing sequence.

Address book application 22 sits under interface 20 and has two layers of data.

Personalized address data 24 forms a personalized or customized address book of the current user and global layer 26 provides address data which is made available to multiple users. A common address book layer 28, shown in hashed lines, may be provided for groups of users, say users belonging to a particular community or place of work or the like.

One way of using the system is to send a search query from the user, carry out an initial search in the customized layer, return any result found, and if no result is found then to carry out a farther search in the common layer if present and finally in the global directory layer. An alternative way of using the system is for the user to specify which address book he wishes to look in, and this is discussed with respect to FIG. 3 below.

An advantage of locating the data on the network is that the data is now available to multiple devices of the same user without any need for synchronization of data between different devices. Furthermore, the user can carry out his search query with one device and have the results retrieved to another device. Thus entering a search query may be easier with a computer as this has an easier interface to manage.

However the results can be retrieved to the telephone, where they are needed.

Alternatively a dialing string can be retrieved by the computer which then causes the agent to place a call to the destination and forward the call to a convenient telephone, since the computer presumably cannot actually handle a telephone call.

Returning to FIG. 1, and a signaling detection unit 40 probes signaling links such as SS7 links, to detect telephony events of the given cellular user. The retrieved events can then be stored as part of a call log application so that the agent stores data of calls received, calls missed etc. As with the address book, the call log information is now available to all of the user's devices and is immune to device failure of the user's mobile device. The user can now for example check on his computer for missed calls.

A further application that may be considered is a messaging application. SMS messages may be formulated at and sent by the agent, and received by the agent. Thus the user can send SMS messages from his home computer and also read them at his home computer or any other device of his.

The present embodiments generally relate to the implementation of a telephony device remote agent on a communication network. The remote agent is intended to always be accessible to the user, and may provide the user with a common address book for all of his terminal devices, commonly stored personal information, profiles etc, and a log of all relevant telephony events, such as received calls, missed calls, SMS, MMS etc. The remote agent may, as described, have access to a global directory, thus making more telephony information available to the user. The remote agent may be always connected as it is part of the network, and may then be accessed by the user through an interface on his terminal device and through a network connection, as a natural part of the dialing process. There is thus no need for a local copy of the address book on the mobile device, and since all networked devices can connect to the address book there is no longer any need to synchronize between different devices. Furthermore since the telephone events are held in common, the user may know from one terminal about attempts to contact him on another terminal.

Figure 3:
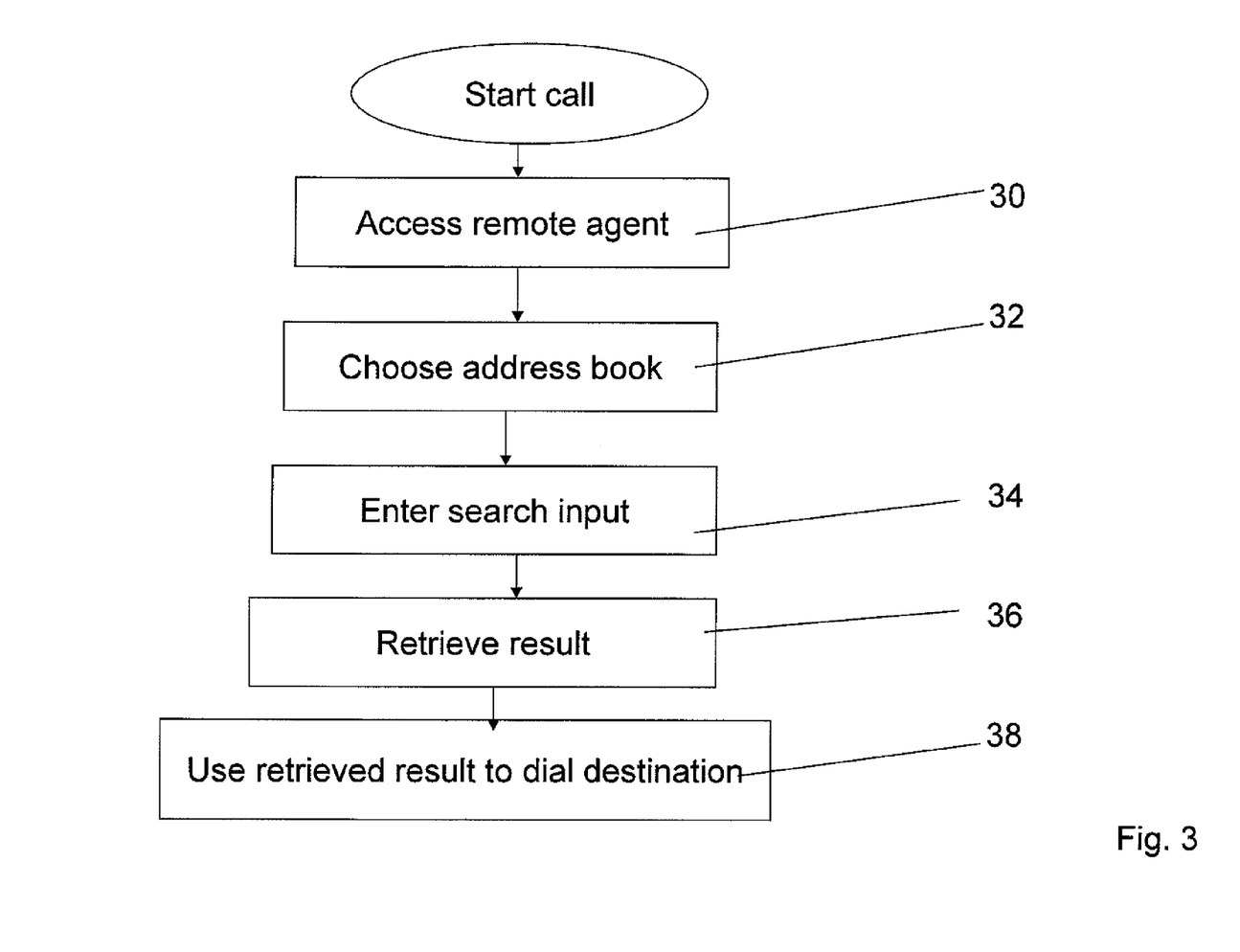
FIG. 3 is a simplified diagram illustrating use of the addressbook of FIG. 2 for the placing of a call using an embodiment of the present invention.

Reference is now made to FIG. 3, which is a simplified flow chart showing a procedure for accessing the remote agent from a terminal to retrieve a telephone number and make a call. The user may access the remote agent—stage 30, choose between the local or global address books—stage 32, select the call destination by searching the global address book and/or the personal address book (or both, in one search operation)—stage 34, retrieve the result in stage 36, and then dial the selected destination in stage 38. As an alternative to selecting between the address books the search may automatically begin on the personal address book and then be continued on the global address book if no result is obtained.

Returning now to FIG. 1, the remote agent can be implemented in a WAP gateway, and can be accessed via WAP or GPRS—the network link referred to above. The agent is available for the existing mobile networks infrastructure, for any mobile device supporting WAP or GPRS. Thus the agent is available to almost all existing mobile devices today. That does not exclude of course any future implementation, using IMS, A-IMS, 3GPP LTE or any future relevant technology.

The remote agent may also be available via the Internet so that a user can retrieve address information via a networked computer or may use his computer to configure his agent, or may use his computer to retrieve events related to his mobile telephone. The global address book may contain data relating to all subscribers of the mobile network, of all mobile networks of a specific country, of fix-line subscribers, or any combination of them. The global address book can further be accessible from any type of network, mobile, fix, WiMAX network, a VoIP service provider or any other network type. The global directory may further contain addresses of any type: fixed numbers, mobile numbers, SIP URIs, IMS public identities, Skype numbers, chat addresses including ICQ and other messenger addresses, and any type of address that may be available for communication and may be useful for creating a telephony session or a multimedia session. Extra graphical information may be attached to particular address book entries as desired for a richer user experience. Thus the user may add personal pictures or the logo of a business entity or the like. There is more incentive with the present embodiments for the user to spend the time and carry out such customizations since the address book is not restricted to the specific terminal device.

The address book may be organized in a layer architecture, where internal layers are the personal address books of the various subscribers, and the external layers are the global address books. The search order for the address book layers can be configured by the subscriber and/or the operator, or selected per search operation as desired. The search for an address can be based on alphabetic search, as in an Internet search engine, a numeric search, or any other relevant search rules, such as rating based search [i.e. based on the rating of this business calls by all users] or history based search [i.e. based on the user history of searches]. The global address book may be common to all subscribers using the service.

The global address book may include a commercial directory, such as the yellow pages directory. The user search in such a case can additionally be based on commercial categories. Thus the user may search for pizza or a taxi. The mobile network can identify the user's location within the network to a certain granularity so in one embodiment results for searches involving business categories can be ordered according to locality. The user looking for pizza thus obtains local pizza restaurants first.

Figure 4:
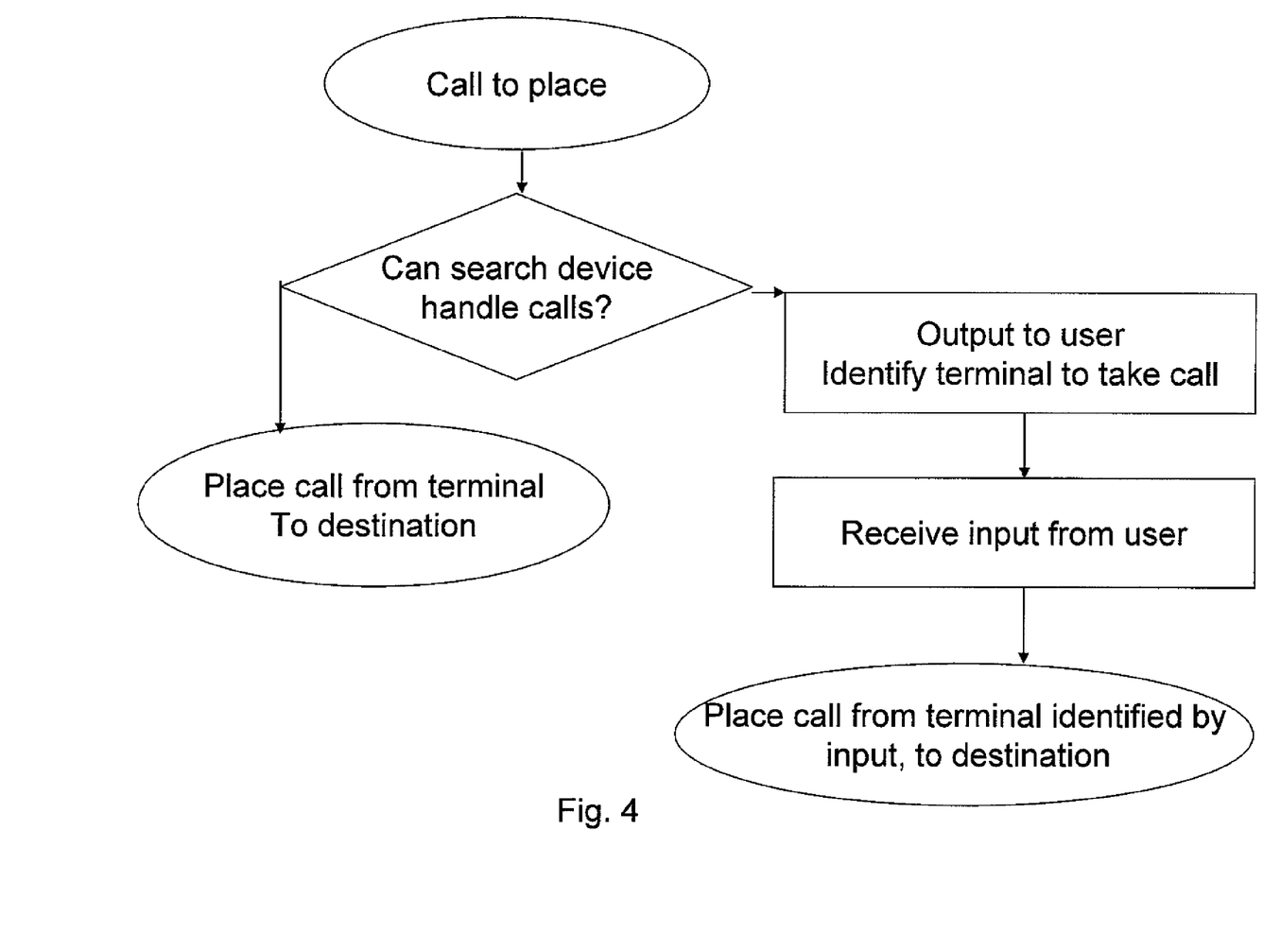
FIG. 4 is a simplified diagram illustrating the selection between direct and callback placement of a call depending on the terminal device being used, according to an embodiment of the present invention.

Reference is now made to FIG. 4, which is a flow chart illustrating a method of call placement according to the present embodiments wherein the terminal device placing the call need not necessarily be able to handle a call. That is to say the call placement need not necessarily be made by a telephone device but could be made by a computer, which cannot itself handle a call. After selecting the dialing destination, the call can be placed directly, or via a callback mechanism, where the remote server hosting the agent creates the call to the destination, and then back to the device. The callback is suitable for cases where the terminal device that was used for the call placement is not in fact a mobile or a fixed line phone but a unit such as a PC, which lacks convenient phone capabilities. In this case, the callback may be routed to a convenient telephone device, for example one identified by user input. The direct placement is represented by the left hand branch of the flow chart, which represents conventional call placement. Callback placement is represented by the right hand branch. The device placing the call cannot itself handle a call, so the user is asked to identify a suitable terminal which can. The server then places the call to the destination and calls back the terminal identified by the user. Alternatively the device to which the call is placed may be preset as a default.

Another case that requires call back is a busy destination, in which the system can offer to the caller a parking feature. When the destination is found to be busy the call is parked, meaning that the destination is watched. As soon as the destination is available the user is called back. In this case the call back is typically to the unit that placed the call, however an option may be provided at the agent to have the callback made to another telephone.

Returning to FIG. 1, the system comprises a Telephony Agent 10, which is a software application implemented on a WAP gateway. The telephony agent may be connected to the user via IP protocol. The IP protocol may be based on GPRS or Wi-Fi or WiMax or any other relevant IP bearer, and the user may be able to connect via regular IP from a computer. A second module is a Logger 44, which collects MO (Mobile Origination) and MT (Mobile Termination) details, analyzes call information and then sends the analyzed information to the Telephony Agent. The logger 40 may be connected to an SS7 mobility probe 14, for collecting notification information about calls, SMS etc., and call control information via MAP, ISUP, INAP and CAMEL messages. Mainly, the SS7 probe is used for monitoring the MAP links (Mobile Application Part), containing SMS messages and some of the call related information.

In addition, the IN (Intelligent Networks) method shown in FIG. 1 is to have a Logger acting as network SCP 42. The SCP 42 obtains call related information via call triggers, such as INAP and CAMEL triggers, continues the call and gathers the relevant information.

The SS7 probe and the SCP can be used together, or separately.

Similar loggers can be connected to SIP routers and IMS network elements such as SIP application servers, for VoIP (Voice over IP) and multimedia session control information.

Figure 5:
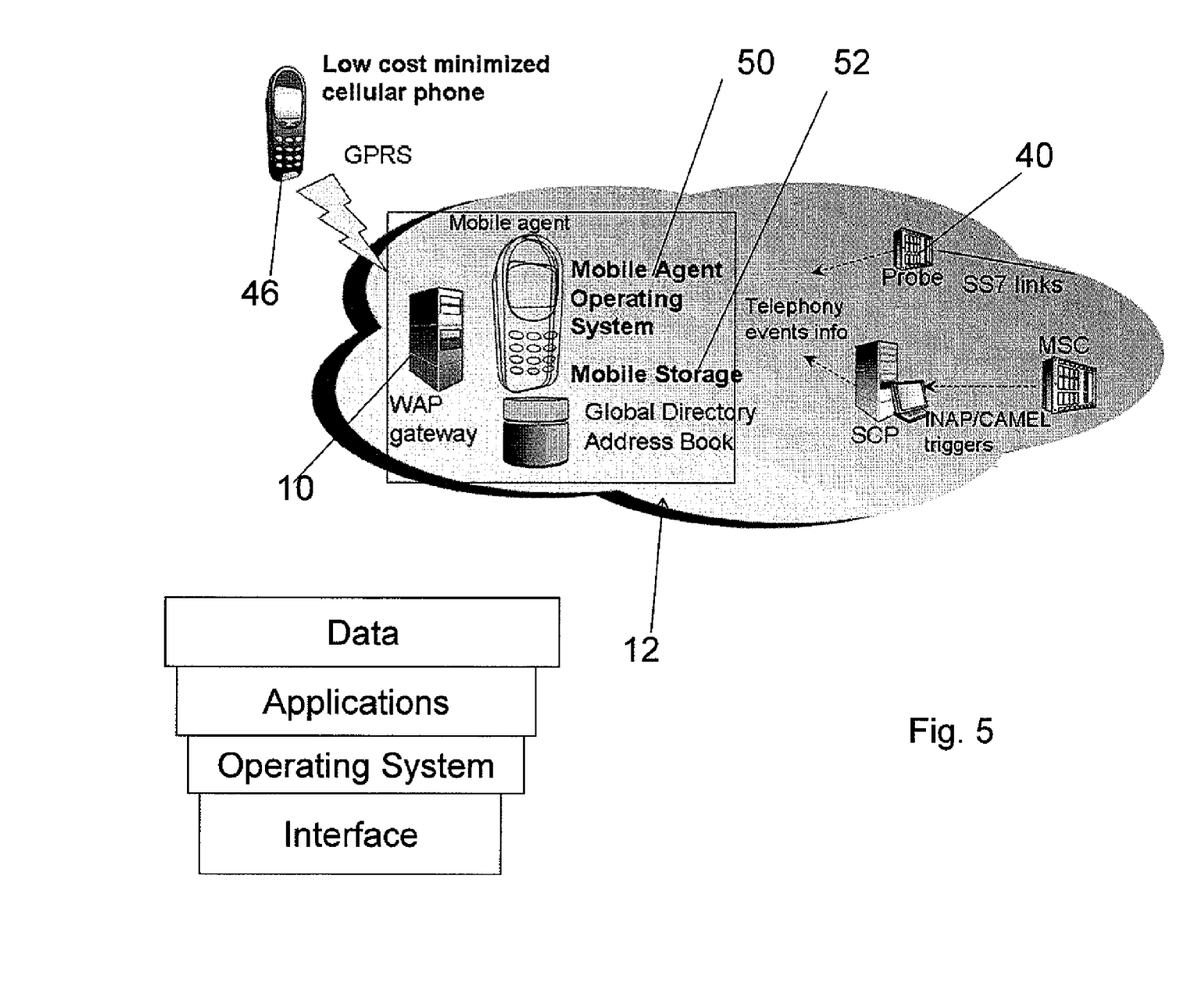
FIG. 5 is a simplified diagram of a network agent based operating system according to a second embodiment of the present invention.

Reference is now made to FIG. 5 which illustrates a further embodiment of the present invention in which not merely applications are placed at the agent but a mobile operating system is placed there, allowing the agent to replace many of the device functions. The embodiment thus allows minimization of the physical handset capabilities. In fact, a network mobile device may be contemplated, in which additional features and capabilities of the mobile telephone reside on the network server, the network mobile agent. The physical mobile device thus needs fewer applications and could in principle be limited to those components required to support the agent, as described hereinabove.

As above the network maintains a personal address book, so that the user can access the address book from other devices and does not need to keep multiple address books in synchronism. The network may additionally support one or more of messages, images, ring tones and other media entities. Some storage for personal information, such as profiles, user interfaces and cookies may nevertheless be kept on the mobile device even in the most minimalist configurations. Furthermore, the device may be able to dispense with an operating system for running client applications, such as J2ME or Symbian mobile operating systems. The device may thus act as the display of a software system running on the server side, the software system on the server side being the network agent. In the most minimalist configuration the device operating system may run on a server, with nothing more than a remote interface on the mobile device.

The minimalist configuration is illustrated in FIG. 5 which is the same as FIG. 1 except that mobile agent 10 includes mobile agent operating system 50, which remotely runs applications in the mobile telephone.

In addition there may be provided mobile agent storage 52 for storing data such as SMS messages for the mobile telephone.

Cellular telephone 46 may have a radio air interface as a standard mobile device (which can work with at least one of GSM, 3G, CDMA or wireless LAN), in order to obtain an IP connection with the server. The device may be able to receive calls and data, including SMS messages, as in common with a regular GSM or CDMA mobile device, and place calls and messages via the global address book, as described hereinabove.

The concept of a network based agent for a mobile device may move the control of the user experience to the mobile operator and enable a seamless user experience when moving to different device, whether a new device or an alternative device of the same user.

The thin device may be cheaper, since all complex and reach functionality may reside on the server. The thin device need only be a simple terminal, connected via IP over the cellular or wireless LAN. Such a device may suit developing countries, where cellular communication has a high growth rate, where fixed line infrastructure is often lacking, and where cheap devices are needed for a huge mass of population, but where new applications and features are as much in demand as elsewhere. There are today cheap low end mobile devices but these devices have poor functionality. The network agent concept supports rich multimedia applications with low cost to the end user. The presence of the called party can be displayed by an icon or other symbol on the global address book line. This is particularly useful to communities and corporate users.

The presence information can be taken from the physical device, which is always connected to the agent if switched on.

In addition, the presence can be gathered from external resources, and the agent can be configured to work with such resources. For example, the Outlook Server or the Email Server of the enterprise may work with the agents. The Outlook Calendar teaches the planned schedule of the user. The Email Server can show the actual availability of the user. When the user is sending an email, that means he is connected, right now, and is available for calls.

It is expected that during the life of a patent maturing from this application many relevant network communication techniques and protocols will be developed and the scope of terms referring to such techniques and protocols is intended to include all such new technologies a priori.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A network-based agent for a cellular telephone user, implemented on an electronic processor, said network-based agent being located on a network and supporting at least one telephone application, the application involving network data storage and network-based communication functionality associated with said at least one application to communicate with a destination party device, said network-based agent being configured to operate with at least one of a plurality of different networked end-user devices of said user to carry out said network based communication functionality associated with said at least one application in response to application interface activity at said at least one user device, said application interface activity being communicated to said network-based agent via said network connection to communicate with said destination party device.

2. The network-based agent of claim 1, further comprising call related data retrieval activity including obtaining a telephone number in response to identification of a call destination from said interface activity.

3. The network based agent of claim 1, configured to provide address book functions.

4. The network-based agent, wherein said call to said destination party device comprises making a connection, said connection being one member of the group comprising a wireless application protocol (WAP) connection a general packet radio service (GPRS) connection, a WiFi connection, a WiMAX connection and an LTE connection.

5. A network based host implemented on an electronic processor and comprising an agent for mobile telephone users, the agent being associated with a respective mobile telephone user, being located on said network and supporting at least one telephone application, the application involving data storage associated with said at least one application and functionality to communicate with a destination party communication device, said software agent comprising:
   mobile telephone application data; and
   an interface to make said application data available over said network to at least one of a plurality of devices of said mobile telephone user and to use said data to carry out telephony operations in response to a connecting device of said mobile telephone user to connect to said destination party communication device.

6. The network-based host comprising an agent of claim 5, wherein said application is an addressbook application accepting query information and providing a corresponding dialing sequence.

7. The network-based host comprising an agent of claim 6, wherein said addressbook application comprises a customized addressbook layer for a respective mobile telephone user.

8. The network-based host comprising an agent of claim 7, wherein said addressbook application further comprises a common directory layer provided in common to a plurality of users.

9. The network-based host comprising an agent of claim 8, wherein said addressbook application is configured to receive a search query from said user, carry out an initial search in said customized layer, return any result found, and if no result is found then to carry out a further search in said common directory layer.

10. The network-based host comprising an agent of claim 8, wherein said common directory layer comprises a global directory.

11. The network-based host comprising an agent of claim 9, configured to receive said search query from a first device, and to return said corresponding dialing sequence to a second device, said first and second devices both being associated with said respective user.

12. The network-based host comprising an agent of claim 11, wherein said first device is an Internet-enabled device and said second device is a telephony-enabled device.

13. The network-based host comprising an agent of claim 5, further associated with a signaling detection unit to detect telephony events of said cellular user.

14. The network-based host comprising an agent of claim 13, comprising a call log application, said data comprising call log information obtained from said signaling detection unit.

15. The network-based hosting agent of claim 14, wherein said call log information comprises at least one member of the group consisting of: missed call information, incoming call information, and received call information.

16. The network-based hosting agent of claim 13, comprising a messaging log application for logging messaging events.

17. The network-based host comprising an agent of claim 16, wherein said messaging events comprise at least one member of the group of events consisting of SMS events and IM (Instant Messaging) events.

18. The network-based host comprising an agent of claim 13, comprising a messaging application, and wherein said data comprises messages sent to and from mobile telephone devices of said user.

19. The network-based host comprising an agent of claim 6, further comprising a call log application storing recently used telephone numbers, combined with said addressbook application, therewith to provide data of said recently used telephone numbers as initial query results.

20. The network agent of claim 1, wherein said user device comprises a non-telephony networked user device.

21. The network agent of claim 1, wherein said application communication activity comprises dialing, said dialing being in response to interface activity at said user device communicated to said network agent via said network connection and wherein said application data comprises address information.

* * * * *